United States Patent
Brooks et al.

(10) Patent No.: US 6,421,259 B1
(45) Date of Patent: Jul. 16, 2002

(54) MODULAR DC DISTRIBUTION SYSTEM FOR PROVIDING FLEXIBLE POWER CONVERSION SCALABILITY WITHIN A POWER BACKPLANE BETWEEN AN AC SOURCE AND LOW VOLTAGE DC OUTPUTS

(75) Inventors: Terry Brooks, Chapel Hill, NC (US); Girish Chandra Johari, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/753,056

(22) Filed: Dec. 28, 2000

(51) Int. Cl.[7] ............ H02M 5/42; H02M 7/04; H02M 7/155
(52) U.S. Cl. ............ 363/84; 363/89; 363/129; 363/53
(58) Field of Search ............ 363/53, 81, 84, 363/87, 89, 125, 129

(56) References Cited

U.S. PATENT DOCUMENTS

| | | | | |
|---|---|---|---|---|
| 4,538,073 A | | 8/1985 | Freige et al. | |
| 4,586,119 A | * | 4/1986 | Sutton | 363/17 |
| 4,860,185 A | * | 8/1989 | Brewer et al. | 363/41 |
| 5,019,717 A | * | 5/1991 | McCurry et al. | 307/66 |
| 6,003,139 A | * | 12/1999 | McKenzie | 713/300 |
| 6,005,773 A | | 12/1999 | Rozman et al. | |

* cited by examiner

*Primary Examiner*—Bao Q. Vu
(74) *Attorney, Agent, or Firm*—Andrew Dillon (57) ABSTRACT

A modular DC power distribution system. A physically discrete input conversion module is utilized for converting a source AC signal to a high voltage DC signal. Multiple universal mounting sites are provided in a power supply backplane for engaging one or more of such input conversion modules. Within the power supply backplane, the high voltage DC signal is delivered to a DC distribution bus. A physically discrete DC step-down module is utilized for converting the high voltage DC signal from the DC distribution bus to a point-of-load DC signal distributable to application boards. The power supply backplane includes multiple universal mounting sites wherein one or more DC step-down modules may be installed or removed. In another embodiment, the DC power distribution system of the present invention includes a pre-charge system for permitting the input conversion modules and the DC step-down modules to be hot plugged into the power supply backplane.

11 Claims, 5 Drawing Sheets

MODULAR DC DISTRIBUTION SYSTEM FOR PROVIDING FLEXIBLE POWER CONVERSION SCALABILITY WITHIN A POWER BACKPLANE BETWEEN AN AC SOURCE AND LOW VOLTAGE DC OUTPUTS

BACKGROUND OF THE INVENTION

1. Technical Field

The present invention relates in general to power supplies and, in particular to a modular DC voltage distribution system. More particularly, the present invention relates to a split input/output modular architecture for providing for run-time flexibility and scalability for DC distribution within an electronic system.

2. Description of the Related Art

Power electronics is facing a new challenge from the development of dynamic, low-voltage applications such as high-performance microprocessor computers systems utilized within network servers. These devices require tight regulation of extremely low voltage outputs as well as very fast response to large load transitions. Applications such as these which demand high power density, low power consumption, high efficiency, and innovative structural implementation require improved power supply technology which has remained relatively static.

The concept of modularity in electronic devices is gaining increasing popularity. A modular electronic system, such as a modular data processing system, grows from a basic configuration accommodating a few users (or having basic features) to a very large configuration accommodating many users (or having augmented features). A network server is one such example of a data processing system having widely varying design variability.

Traditionally, power supplies for electronic devices such as servers are custom designed. Significant development time and resources are required to support such customization for systems having individualized power requirements. Since the design and construction of a custom power supply presumably overlaps the design phase of the data processing system, supply capacity requirements may have to be adjusted, resulting in an overall delay in product development.

It would therefore be desirable to provide a modular power supply system that addresses increasingly unpredictable power supply requirements.

SUMMARY OF THE INVENTION

A modular DC power distribution system is disclosed herein. A physically discrete input conversion module is utilized for converting a source AC signal to a high voltage DC signal. Multiple universal mounting sites are provided in a power supply backplane for engaging one or more of such input conversion modules. Within the power supply backplane, the high voltage DC signal is delivered to a DC distribution bus. A physically discrete DC step-down module is utilized for converting the high voltage DC signal from the DC distribution bus to a point-of-load DC signal distributable to application boards. The power supply backplane includes multiple universal mounting sites wherein one or more DC step-down modules may be installed or removed. In another embodiment, the DC power distribution system of the present invention includes a pre-charge system for permitting the input conversion modules and the DC step-down modules to be hot plugged into the power supply backplane.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention.

Disclosed herein is a distributed power architecture for high or low level computer applications. The architecture consists of discrete input and output power conversion modules that may be installed or removed as necessary from a power distribution interface. As described in further detail hereinbelow, each input conversion module is designed to convert a source AC line signal into a high voltage DC signal (typically on the order of 380 volts DC) that is applied to a DC distribution bus within the power distribution interface. Each output conversion module converts the high-voltage DC signal into lower voltage DC levels distributable to application circuits.

Scalability for source DC voltage is readily available by installing or removing input conversion modules into or from universal input conversion module mounting sites provided on a power supply backplane. Universal DC step-down module mounting sites are also included on the backplane such that scalability for point-of-load DC is afforded a limited independence from the source DC provided by the input conversion modules. Such an arrangement differs from conventional bulk power supply architecture by utilizing self-contained, physically discrete input conversion and output step-down modules as the dividing medium between the AC-to-DC and DC-to-DC power boundary.

Figure 1:
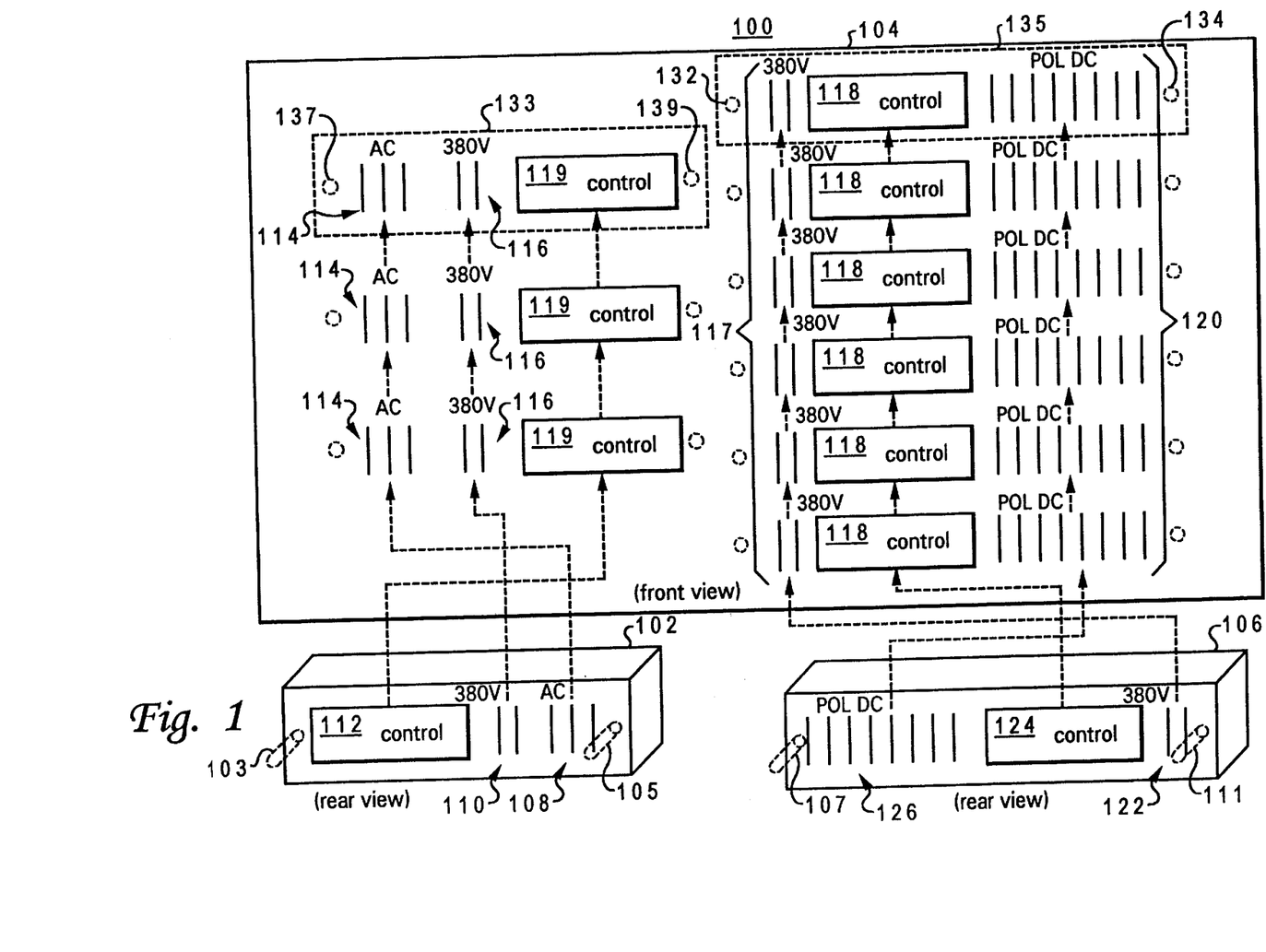
FIG. 1 is a block diagram illustrating a modular DC distribution system in accordance with a preferred embodiment of the present invention.

Turning now to the figures wherein like reference numerals refer to like and corresponding parts throughout, and in particular with reference to FIG. 1, there is depicted a block diagram illustrating a modular DC distribution system 100 in accordance with a preferred embodiment of the present invention. DC distribution system 100 relies on two basic modules, an input conversion module 102 and a DC step-down module 106 as the building blocks for developing a modular, hot-pluggable architecture. A power supply backplane 104 provides an electromechanical interface for input conversion module 102 and DC step-down module 106.

As depicted in FIG. 1, power supply backplane 104 includes three input conversion module mounting sites 133. Each input conversion module mounting site includes AC input blades 114, a control interface 119 and 380 volts DC output blades 116. AC output blades 114 provide a contact point for AC source voltage on the front of power supply backplane 104. Control interface 119 provides a transmission medium across which power supply control signals are delivered between input conversion module 102 and power supply backplane 104. DC input blades 116 serve as the electrical contact over which high-voltage DC power is delivered into power supply backplane 104 from the output of input conversion module 102.

As explained in further detail with reference to FIG. 2, input conversion module 102 includes rectification circuit means and possible voltage step-up means for converted a source AC voltage into a relatively high-voltage DC level of approximately 380 volts DC. In an important feature of the present invention, input conversion module 102 is a physically discrete unit that is readily installable into any of the multiple input module mounting sites 133 within power supply backplane 104.

The rear view of input conversion module 102 reveals its backplane plug-in interface. Included within the backplane plug-in interface of input conversion module 102 is a control interface 112, AC input blades 108, and 380 volts DC output blades 110. Control interface 112 provides the electrical medium across which power supply control signals are passed between control interface 119 and input conversion module 102. AC input blades 108 comprise electromechanical connection means for engaging corresponding AC output blades 114 when input conversion module 102 is plugged into one of input conversion module mounting sites 133. Source AC power is thus delivered from power supply backplane 104 at AC output blades 114 into input conversion module 102 at AC input blades 108. Of similar or identical physical design, are 380 volts DC output blades 110 that engage 380 volts DC input blades 116 and thus permit 380 volts DC to be transferred as an output of input conversion module 102 into a DC distribution bus as further explained with reference FIG. 2.

Six DC step-down module mounting sites 135 are also included on the front face of power supply backplane 104 each of which includes 380 volts DC output blades 117, a control interface 118, and point-of-load DC output blades 120. Control interface 118 provides a transmission medium across which power supply control signals are delivered between DC step-down module 106 and power supply backplane 104. The electromechanical interface for applying the 380 volts DC supplied by input conversion module 102 is provided within DC step-down module mounting sites 135 by 380 volts DC output blades 117. Point-of-load DC output blades 120 serve as the electrical contact over which low voltage point-of-load DC power is delivered into power supply backplane 104 from the output of DC step-down module 106. In a preferred embodiment of the present invention, and as further illustrated in FIG. 2, point-of-load DC input blades 120 include multiple electrical contacts wherein each contact is connected within power supply backplane 104 to point-of-load supply lines of various voltage levels.

As explained in further detail with reference to FIG. 2, DC step-down module 106 includes DC/DC conversion means for converting the high-voltage signal received from 380 volts DC output blades into low voltage point-of-load voltage levels. In an important feature of the present invention, DC step-down module 106 is a physically discrete unit that is readily installable into any of the multiple DC step-down module mounting sites 135 within power supply backplane 104.

The rear view of DC step-down module 106 reveals its backplane plug-in interface. Included within the backplane plug-in interface of DC step-down module 102 is a control interface 124, 380 volts DC input blades 122, and point-of-load DC output blades 126. Control interface 124 provides the electrical medium across which power supply control signals are passed between control interface 118 and DC step-down module 106. 380 volts DC input blades 122 comprise electromechanical connection means for engaging corresponding 380 volts DC output blades 117 when DC step-down module 106 is plugged into one of DC step-down module mounting sites 135. Point-of-load DC output blades 126 engage point-of-load DC input blades 120 and thus permit point-of-load voltages generated within DC step-down module 106 to be delivered to application circuits from power supply backplane 104.

Overall power supply demands, in terms of total current drawn from power supply backplane 104, are flexibly addressed by the universal installability of input conversion modules such as input conversion module 102 into one or more of input conversion module mounting sites 133.

The six universal DC step-down module mounting sites provides the ability to address moderate load changes independently from the AC-to-DC conversion within the input conversion modules. With three input conversion mounting sites and six DC step-down modules, the depicted embodiment contemplates an input power density that is higher than on the output side. Additional DC step-down modules identical in construction to module 106 can be installed and removed as necessary to address moderate changes in load requirements.

Figure 2:
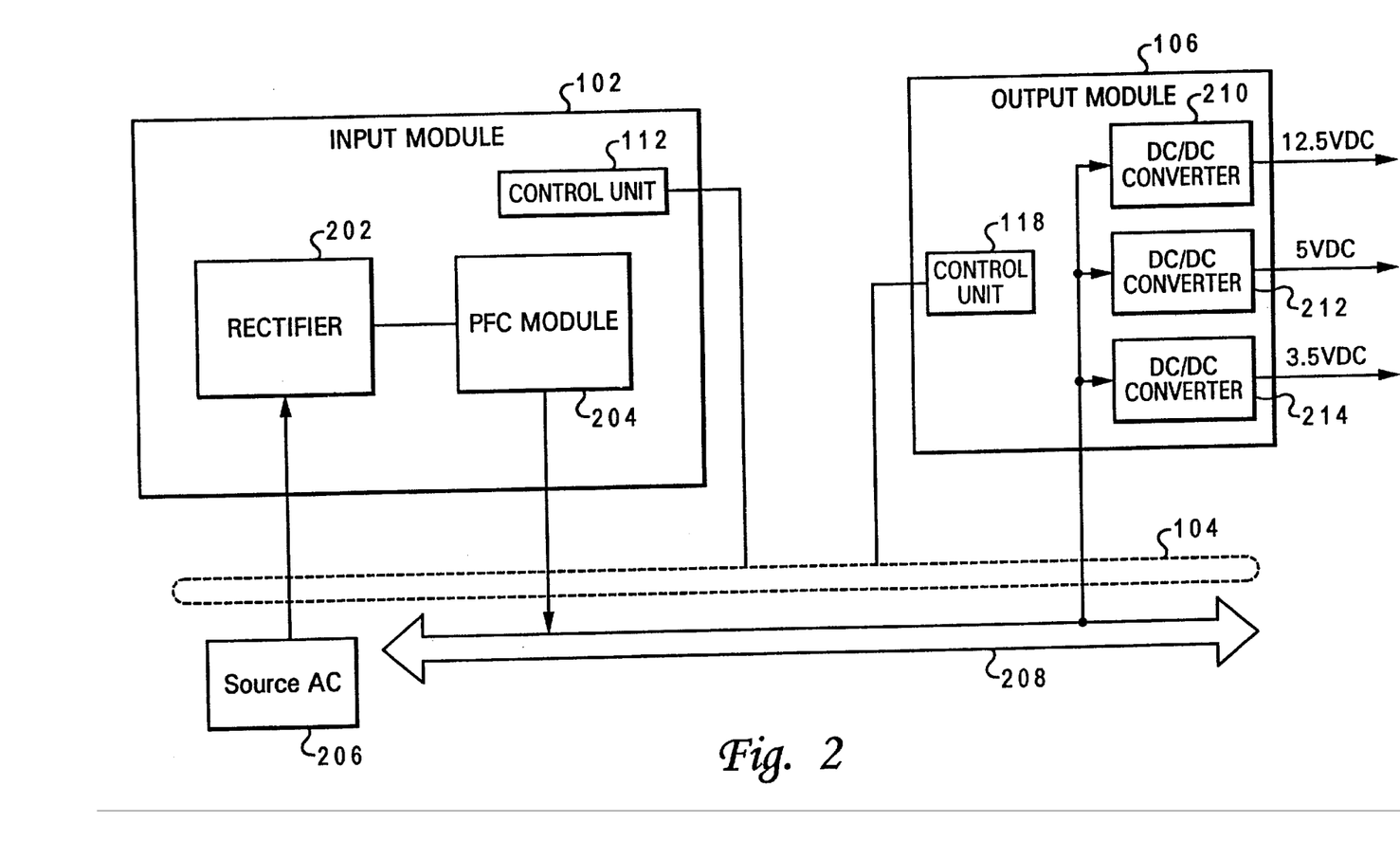
FIG. 2 is a high-level block diagram depicting the electrical connectivity implemented within the modular DC distribution system shown in FIG. 1.

Turning now to FIG. 2 there is illustrated a high-level block diagram of the electrical connectivity implemented within modular DC distribution system 100. As illustrated in FIG. 2, input conversion module 102 includes a rectifier module 202 and a power factor correction module 204 that convert a source AC signal from a source module 206 into a high voltage DC signal applied to a DC distribution bus 208. Source module 206 and DC distribution bus 208 are located behind power supply backplane 104.

As further illustrated in FIG. 2, DC step-down module 106 includes DC-to-DC converters 210, 212, and 214 for converting the high-voltage DC from DC distribution bus 208 to 12 volts, 5 volts, and 3.5 volts respectively. The lower voltage outputs from DC step-down module 106 are directly applicable to application boards within the system powered by DC distribution system 100.

Figure 3:
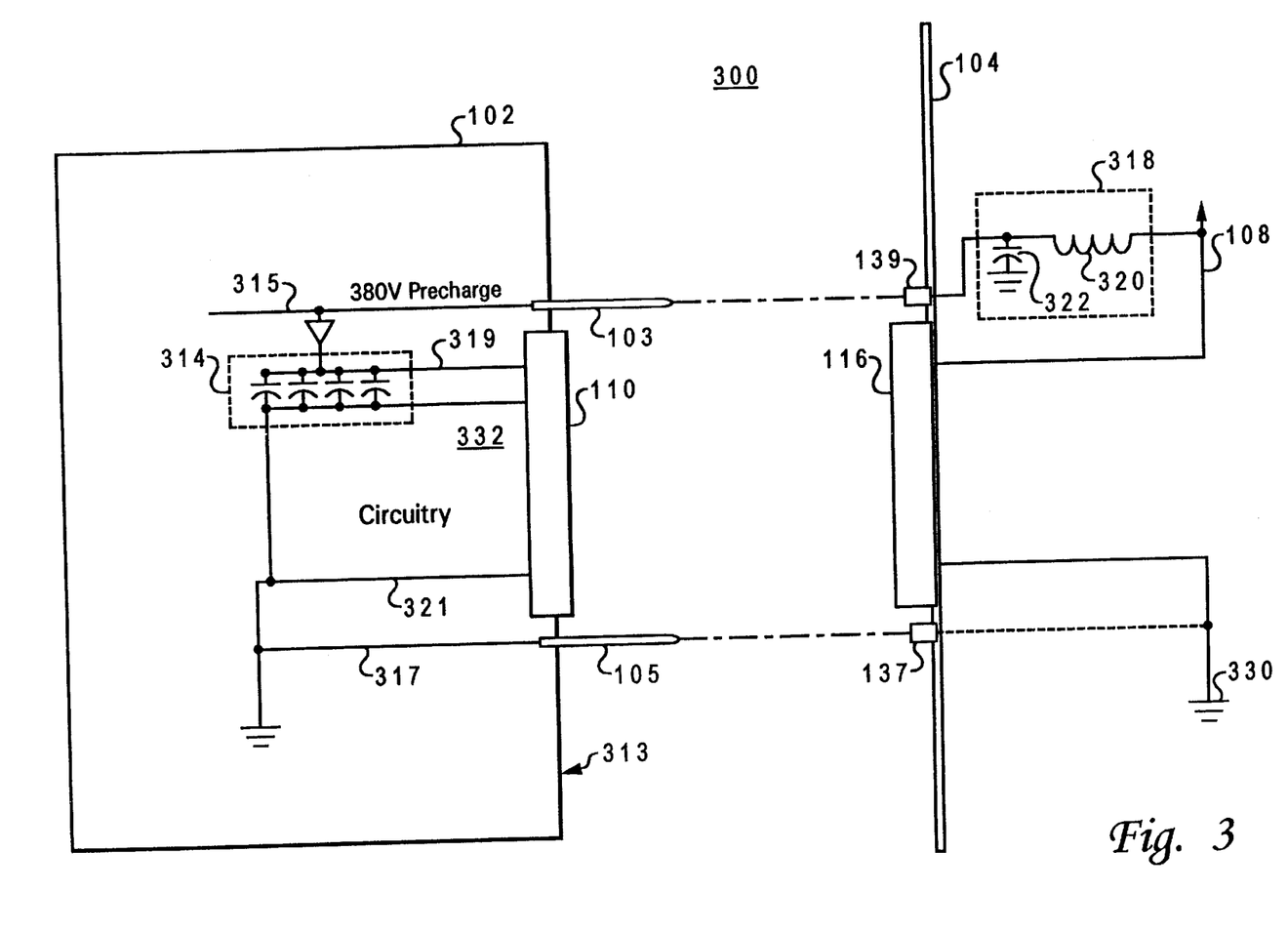
FIG. 3 is a schematic representation of the pre-charge apparatus applicable to a modular DC voltage distribution system in accordance with one embodiment of the present invention.
Figure 4:
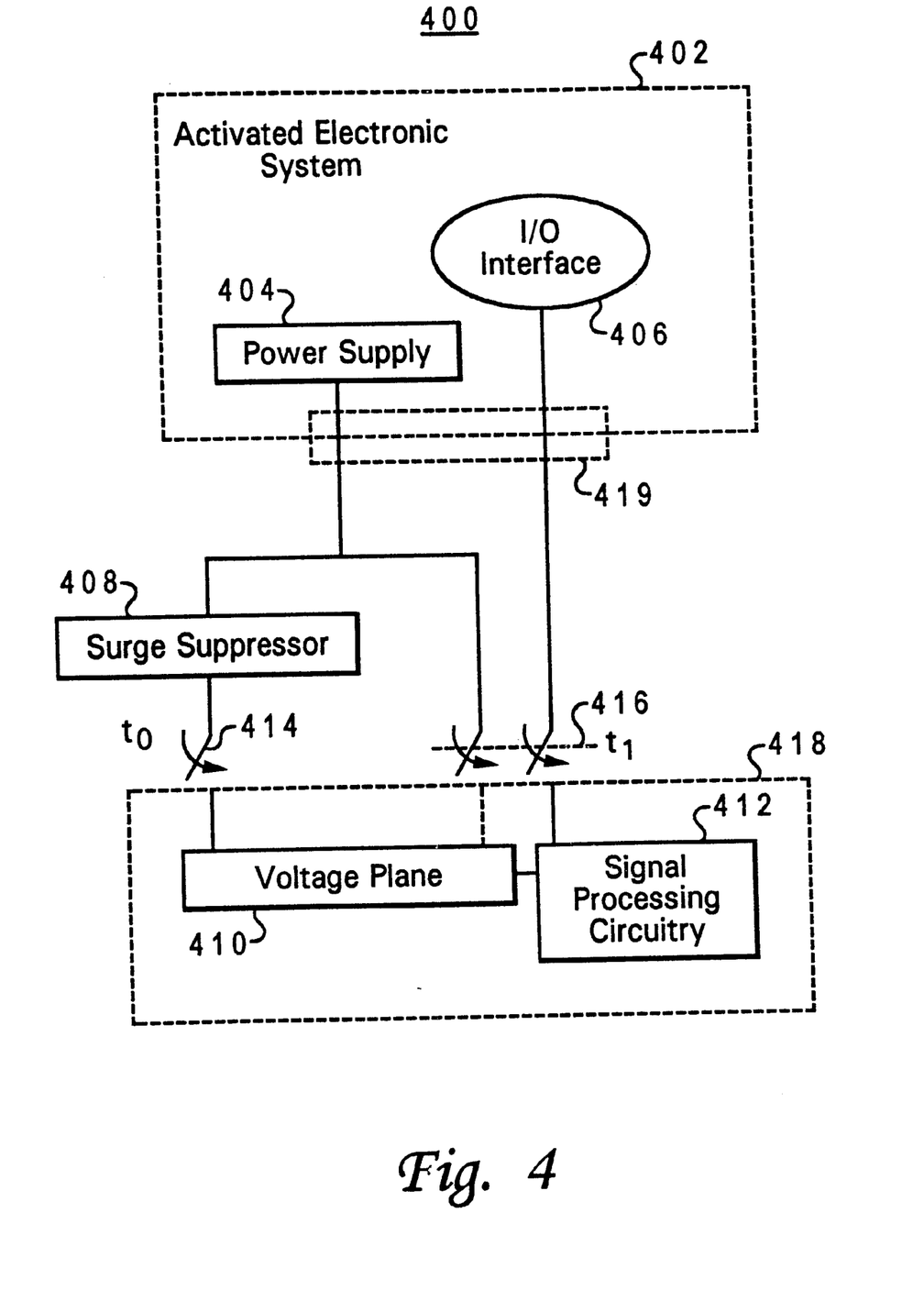
FIG. 4 illustrates a generalized block diagram of the pre-charge apparatus in FIG. 3.
Figure 5:
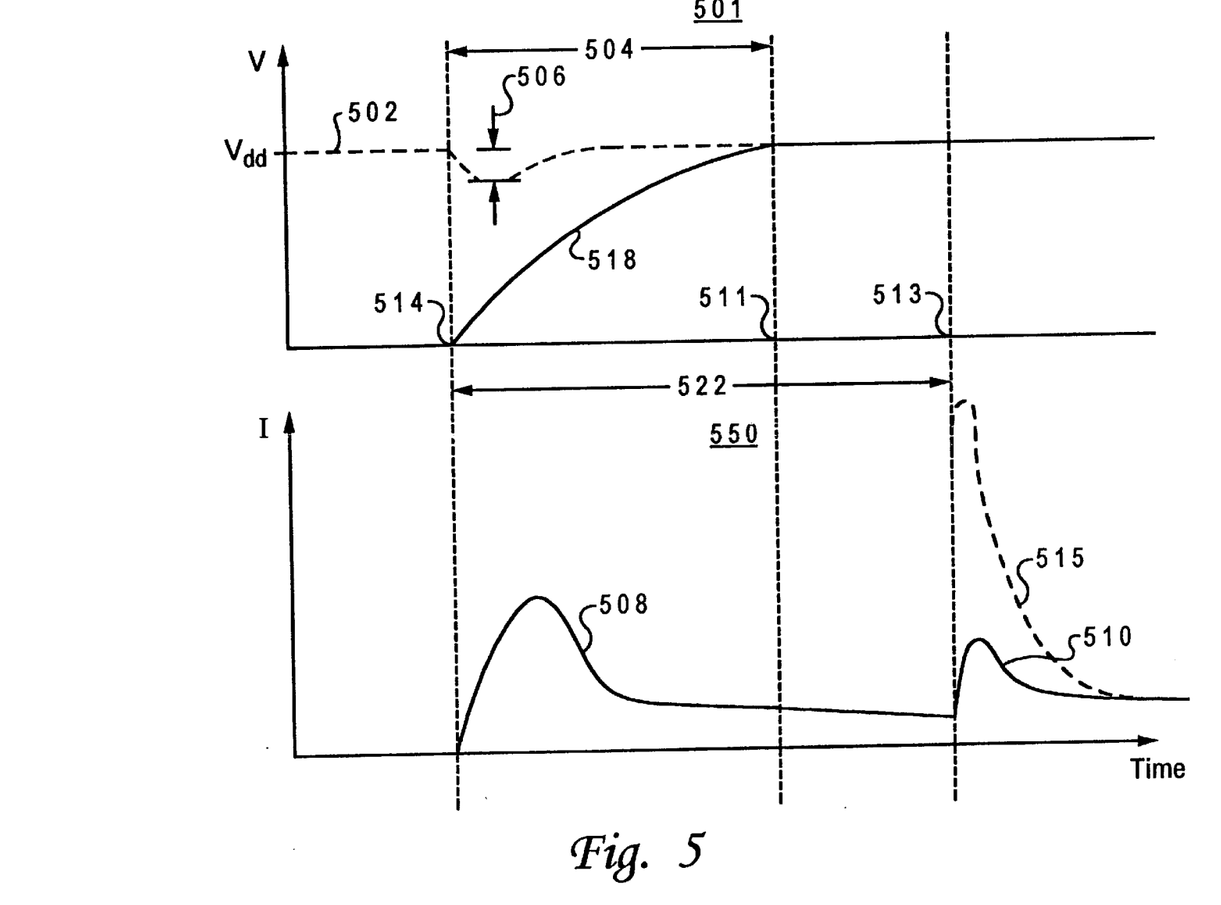
FIG. 5 is a graphical representation of the pre-charge and power supply response, in terms of voltage and current levels of the pre-charge apparatus depicted in FIG. 3 and FIG. 4.

Duplicates of input conversion module 102 and DC step-down module may be readily installed or removed during system load changes or when a faulty module is detected. A preferred embodiment of the present invention includes a hot pluggability feature by which a defective module may be replaced or an additional module may be installed without having to power down either the power supply backplane or the load system. Transient disturbances caused by current arcing and voltage dropout during live insertion, are a source of problems for the operation as well as the electrical behavior of the system. In particular, current arcing at the interconnection interface may cause the supply voltage level to drop below allowable limits (commonly referred to in the art as "voltage dropout"), thus resulting in system disturbances and associated logical errors. As depicted in FIGS. 3, 4 and 5, the present invention addresses the problem of voltage arcing and voltage dropout that occur when an input conversion module or a DC step-down module, such as those depicted in FIGS. 1 and 2, are inserted into an activated system. For simplicity, both the input conversion module and DC step-down module will be uniformly referred to simply as a "module" in the following description.

The hot plug feature described herein prevents transient disturbances within the power distribution system that would otherwise when a "dead" module is inserted into a live system. Decoupling capacitors within the module circuitry (referred to interchangebly hereinafter as "input capacitance"), when presented with an instantaneous voltage across them during insertion into the system, act as a momentary short circuit. The result is an enormous inrush of current and associated dropout of the voltage on the power supply backplane into which the module is inserted. Since the capacitors are initially at zero potential, they present an instantaneous short circuit to the supply voltage until they are fully charged in accordance with the source potential within the power supply backplane.

The system and method of the present invention provide a means to pre-charge the capacitors within a module to the backplane voltage level before engaging the module circuits so that the system power supply voltage levels are not adversely affected by insertion of the card. Referring back to FIG. 1, each of input conversion module mounting sites 133 includes a pair of coupling sites 137 and 139 for engaging a pair of corresponding hot plug connection members 105 and 103 respectively. Similarly, each of DC step-down module mounting sites 135 includes a pair of coupling sites 132 and 134 for engaging a pair of corresponding hot plug connection members 111 and 107 respectively. As described in further detail hereinbelow, such hot plug connection members and coupling sites provide a hot plug interface for the input conversion and DC step-down modules as described above.

Implementation of the hot plug feature of the present invention results in a reduction in magnitude of the inrush current to an acceptable level, such that the main power supplies and decoupling can adequately compensate and react. In a preferred embodiment of the present invention, this "throttling" of the inrush current is accomplished by pre-charging the decoupling capacitance through surge suppression means. The current inrush response is slowed substantially, thus reducing the initial current surge and also allowing sufficient time for the desired pre-charge to complete. This pre-charging should be accomplished as the module is being installed into the power supply backplane, making it transparent to the end user.

In accordance with the embodiments depicted in FIGS. 3 and 4, module engagement means comprising the aforementioned connection members (in the form of conductive posts or pins) and coupling sites are utilized to implement the pre-charge function, as they make contact several tens of millimeters before any other connector contact is made. It should be noted that the surge suppression circuitry utilized to pre-charge the internal circuitry within a module may be detrimental to the steady state operation of card circuitry since it does not allow instantaneous response to the changing voltage requirements of such circuitry. Therefore, the surge suppression circuitry must be disabled when the card is fully engaged. The figures described hereinbelow illustrate and further describe the overall pre-charge scheme implemented in accordance with one embodiment of the present invention.

Referring now to FIG. 3, there is depicted a simplified schematic representation of a pre-charge system for permitting an input conversion module or DC step-down module as described herein to be hot-plugged into a power supply backplane. Specifically, FIG. 3 depicts a pre-charge system 300 for hot-plugging input conversion module 102 into power supply backplane 104. Input conversion module 102 includes circuitry 332 for performing the AC/DC conversion described with reference to FIGS. 1 and 2. It should be noted that a pre-charge system similar to that depicted in FIG. 3 may be incorporated with respect to DC step-down module 106 and that a preferred embodiment in accordance with a preferred embodiment.

As illustrated in FIG. 3, high voltage DC output blades 110 are attached to the terminal (rear) edge 313 of input conversion module 102. It will be understood by those skilled in the art that high voltage DC output blades 110 may be any one of a variety of specific types of backplane receptacle engagement devices. For the embodiment depicted, it is contemplated that high voltage DC output blades 110 consist of a plurality of conductive pins extending a fixed, equal length from terminal edge 313. These engagement pins serve as inputs and outputs to and from the circuit block 332.

The devices within circuit block 332 may often have a substantial rail-to-rail decoupling capacitance. Such a decoupling capacitance (referred to alternatively as "input capacitance"), is depicted in FIG. 3 as a bank of capacitors 314 residing within circuitry 332 across a power plane 319 and a ground plane 321. It will be appreciated and understood by those skilled in the art that any number of capacitors, capacitive elements, etc., may be included within capacitor bank 314 depending on the nature of the circuitry within block 332. The total capacitance within capacitor bank 314 is felt across corresponding pins within high voltage DC output blades 110.

Also attached to and extending from terminal edge 313, are connection members 103 and 105 which, in conventional configurations, serve only to guide and fasten input conversion module 102 to backplane 104. The system and method of the present invention require that connection members 103 and 105 themselves be conductive and be electrically coupled across capacitor bank 314 via conductive paths 315 and 317. As an important feature of the present invention, it should be noted that connection members 306 and 308 extend from terminal edge 313 well beyond edge connector 310 on the order of tens of millimeters in a preferred embodiment.

On the backplane side, high voltage DC input blades 116 and coupling sites 139 and 137 provide means for mechanically and electrically engaging input conversion module 102. As explained with reference to FIGS. 1 and 2, high voltage DC input blades 116 is the medium over which converted high voltage DC is delivered from input conversion module 102 to DC distribution bus 108 and a ground plane 330 within backplane 104.

High voltage DC input blades 116 engage high voltage DC output blades 110 and thus connecting circuit block 332 to and power and ground planes 108 and 330. In this manner, voltage and ground planes 108 and 330 are applied directly to corresponding power and ground planes 319 and 321 within circuit block 332 when input conversion module 102 has been fully inserted into backplane 104. As further illustrated in FIG. 3, coupling site 139 is electrically coupled to DC distribution supply bus 108.

The depicted embodiment includes a surge suppresser 318 that provides a current surge buffer between DC distribution bus 108 and coupling site 139. Surge suppresser 318 includes an inductor 320 and a decoupling capacitor 322. Inductor 320 provides a current surge buffer function whose purpose is two-fold. First, the buffer limits the magnitude of a current surge from DC distribution bus 108, thereby minimizing arcing between coupling site 139 and connection member 103. Second, by limiting the current drawn at a given instant in time, the voltage level on DC distribution bus 108 is prevented from dropping out of specified limits. It will be understood by those skilled in the art that the simple inductance configuration depicted within surge suppresser 318, may in alternate embodiments, be replaced by more complex surge protection circuitry including both active and passive devices such as transistors and resistors.

To achieve time delayed and buffered pre-charging, connection members 103 and 105 must contact corresponding coupling sites 139 and 137 prior to high voltage DC output blades 110 engaging high voltage DC input blades 116. To ensure adequate pre-charge duration, and in a preferred embodiment of the present invention, the length of connection members 103 and 105 must be set such that the time span between engagement of the mutually offset contacts will be on the order of at least tens of milliseconds. In this manner, when input conversion module 102 is initially inserted into backplane 104, capacitor bank 314 will be charged in a controlled manner to the voltage level of DC distribution bus 108.

By providing a buffered input voltage source to accommodate the initial current demands of capacitor bank 314 prior to connecting of circuit block 332 to DC distribution bus 108, the magnitude of inrush current from DC distribution bus 108 is held to an acceptable level, thereby avoiding current arcing and voltage dropout that would otherwise occur on DC distribution bus 108.

With reference now to FIG. 4 there is illustrated a simplified block diagram comprising a pre-charge system 400 in accordance with the teachings of the present invention. As seen in the depicted example, pre-charge system 400 includes component devices that may reside on either or both of an activated electronic system 402 and a module 418 that may be hot plugged into a backplane interface 419 within electronic system 402. The system and method of the present invention include two characteristic features that prevent arcing and voltage dropout during insertion of a module into a live system.

The first pre-charge feature depicted in FIG. 4 is the time difference between when the input capacitance residing on voltage plane 410 is pre-charged, and when the entire input conversion module circuitry is placed on line. It is preferred that the time differential between $t_0$ and $t_1$ be from at least 10 milliseconds to permit adequate time for the capacitance residing on voltage plane 410 to fully charge prior to switch 416 closing. It should be noted that within the description of pre-charge system 400, reference to the physical embodiment depicted in FIG. 3 are intended as illustrative aids only. Those skilled in the art will appreciate that many other possible configurations of devices may be utilized to implement the pre-charge function depicted in FIG. 4 without departing from the spirit or scope of the present invention.

As explained with reference to FIG. 3, conductive connection members are constructed on the terminal edge of module 418, such that prior to full insertion of input conversion module 418, the connection members electrically contact conductive card guide receptors. This initial contact between module 418 and the backplane within electronic system 402 is represented by switch 414 closing at time $t_0$. The remaining circuitry 412 residing on module 418, is finally coupled into a backplane receptor within electronic system 402 when an edge connector 310, contacts the live backplane receptor, as represented by switch 416 closing at time $t_1$. The contact represented by the closing of switch 414 at $t_0$, will occur substantially prior to time $t_1$, due to the substantial difference in the length of extension from the edge of module 418 between the connection members and the edge connector. In the embodiment depicted in FIG. 4, a surge suppresser 408 is utilized to buffer the pre-charge current from power supply 404 to voltage plane 410. This buffering will commence at time $t_0$ and terminate at time $t_1$. It should be noted that the placement of surge suppresser 408 outside electronic system 402 and module 418, is for illustrative purposes only, and that an actual implementation of the present invention, the components comprising surge suppresser 408 may be placed within either or divided between both. It should also be noted that in a preferred embodiment, the time span commencing at $t_0$ and terminating at $t_1$ will be at least 10 and no more than 100 milliseconds.

Turning now to FIG. 5, graphical representations of voltage and current responses from pre-charge system 400 are depicted. The response curves illustrated in FIG. 5 demonstrate the sequence of events resulting from the addition of pre-charge system 400 to the system to be hot plugged. As seen in FIG. 5, a voltage response 501 includes a pre-charge voltage curve 518 superimposed on the same timeline with a voltage supply level curve 502. Pre-charge voltage curve represents the relative voltage level as seen across the input capacitance of module 418. Voltage supply curve 502 illustrates the voltage level residing on power supply 404 before, during, and after insertion of input conversion module 418. Time 514 marks the commencement of the events represented by switch 414 closing at $t_0$ (connection members 306 and 308 contact card guide receptors 328 and 326). Pre-charge curve 518 commences from that point in a logarithmic manner until it is equal to voltage supply level 502 at time 511. Time 511 therefore depicts the point in time at which the input capacitance of module 418 has been fully charged.

A current response timeline 550 includes a pre-charge current response 508 and a steady state circuit card current 510. Pre-charge current response curve 508 represents the current response drawn from power supply 408 into input capacitance within voltage plane 410. Pre-charge current response curve corresponds to the pre-charging events described above. The system of the present invention limits the peak magnitude of a current surge from power supply 404 to prevent excessive voltage dropout. It should be noted that a slight drop in power supply voltage occurs during the pre-charge phase as depicted by voltage drop 506. Most computer systems are designed to tolerate slight deviations without disruption of the system however.

It is not until time 513 that the circuit card edge connector contacts the backplane receptor. Beginning at time 513, circuitry 412 will draw steady state current level 510 that is well below that required to cause arcing or voltage dropout.

A current spike 515 is superimposed on the same timeline to demonstrate the relative magnitude and rapid rise time of the inrush current that would be experienced by power supply 404 in the absence of the pre-charge function of the present invention.

The system and method of the present invention produce the benefits that result when electrical transients caused by hot plugging of a high capacitance circuit card into an electronic system with limited current supply capabilities are properly managed. In this manner, the present invention addresses the root causes of electrical insertion transients by managing the time sequence over which the input capacitance of a card is charged and also providing a surge suppresser to prevent arcing.

While the invention has been particularly shown and described with reference to a preferred embodiment, it will be understood by those skilled in the art that various changes in form and detail may be made therein without departing from the spirit and scope of the invention.

What is claimed is:

1. A modular DC power distribution system for providing flexible power conversion scalability within a power backplane between an AC source and low voltage DC outputs, said modular DC power distribution system comprising:

an input conversion module for converting a source AC signal to a high voltage DC signal, wherein said input conversion module is a physically discrete unit that is installable onto any of a plurality of input conversion module mounting sites;

a DC step-down module for converting said high -voltage DC signal to a point-of-load DC signal distributable to application boards, wherein said DC step-down module is a physically discrete unit that is installable onto any of a plurality of DC step-down module mounting sites; and a power distribution interface for delivering said high voltage DC signal from said input conversion module to said DC step-down module, wherein said power distribution interface includes a power supply backplane including said plurality of input conversion module mounting sites for electromechanically engaging said input conversion module, said power supply backplane further including said plurality of DC step-down module mounting sites for electromechanically engaging said DC step-down module.

2. The modular DC power distribution system of claim 1, wherein each of said input conversion module mounting sites comprises an AC output contact for connecting said source AC signal to said input conversion module.

3. The modular DC power distribution system of claim 2, wherein said input conversion module comprises an AC input contact for receiving said source AC signal from said AC output contact within said input conversion mounting site.

4. The modular DC power distribution system of claim 1, wherein each of said input conversion module mounting sites comprises a DC input contact for receiving said high voltage DC signal from said input conversion module.

5. The modular DC power distribution system of claim 1, wherein said power distribution interface further comprises a DC distribution bus for connecting said high voltage DC signal from each of said plurality of input conversion module mounting sites to one or more of said DC step-down module mounting sites.

6. The modular DC power distribution system of claim 4, wherein each of said DC step-down module mounting sites further comprises a DC output contact for connecting said high voltage DC signal from said DC distribution bus to said DC step-down module.

7. The modular DC power distribution system of claim 1, wherein each of said DC step-down module mounting sites comprises a DC input contact for receiving said point-of-load DC line signal from said DC step-down module.

8. The modular DC power distribution system of claim 1, wherein said power distribution interface includes point-of-load DC distribution lines for connecting said point-of-load DC signal from each of said DC step-down module mounting sites to said application boards.

9. The modular DC power distribution system of claim 1, wherein said input conversion module and said DC step-down module further comprise a hot plug adapter for permitting said input conversion module and said DC step-down module to be hot-plugged into said power supply backplane.

10. The modular DC power distribution system of claim 9, further comprising surge suppression means between said input conversion module and said input conversion module mounting sites for permitting said input conversion module to be hot-plugged into said power supply backplane.

11. A system for pre-changing a input capacitance of a module during insertion of said module into an activited electronic system, said system comprising:

a module having a terminal edge from which an edge connector extends a first length, said module having an input capacitance across said edge connector;

a backplane within an activated electronic system for receiving said module, wherein said backplane includes at least one voltage plane, a backplane receptor, and module reception means, said backplane receptor electrically coupling said edge connector to said at least one voltage plane when said edge connector engages said backplane receptor;

connection means for guiding and connecting said module into said backplane, said connection means including at least one conductive member for engaging said module receptor means, said at least one conductice member extending a second length from said terminal edge, wherein said second length is greater than said first length; and at least one conductive path for electrically coupling said at least one conductive member across said input capacitance.

* * * * *